United States Patent [19]

Offringa et al.

[11] Patent Number: 4,813,457
[45] Date of Patent: Mar. 21, 1989

[54] FLANGED PIPE PART MADE OF FIBER-REINFORCED THERMOSETTING SYNTHETIC RESIN WITH PROTECTIVE LAYER PREVENTING CRACK FORMATION IN AN ANGULAR INTERSECTION

[75] Inventors: Oege R. Offringa, Hardenberg; Hendrik Waterink, Mariënberg; Geert J. Pertien, Hardenberg; Jan T. Brinke, Berentheim, all of Netherlands

[73] Assignee: Wavin, Zwolle, Netherlands

[21] Appl. No.: 196,800

[22] Filed: May 16, 1988

Related U.S. Application Data

[63] Continuation of Ser. No. 932,094, Nov. 18, 1986, abandoned.

[30] Foreign Application Priority Data

Nov. 20, 1985 [NL] Netherlands ......................... 8503198

[51] Int. Cl.$^4$ ................................................ F16L 9/16
[52] U.S. Cl. ..................... 138/109; 138/172; 285/405; 285/425; 249/89
[58] Field of Search ................... 285/405, 423; 249/89; 264/257, 258; 156/294; 138/109, 153, 174, 172

[56] References Cited

U.S. PATENT DOCUMENTS

| | | | |
|---|---|---|---|
| 2,667,369 | 1/1954 | Harper | 285/423 |
| 2,703,109 | 3/1955 | Saville | 138/109 |
| 3,537,484 | 11/1970 | McLarty | 138/109 |
| 3,540,759 | 11/1970 | Schneider | 285/423 |
| 3,796,449 | 3/1984 | McLaughlin et al. | 285/423 |
| 4,065,339 | 12/1977 | Lippert et al. | 285/423 |
| 4,330,016 | 5/1982 | Grendelman | 285/423 |
| 4,523,738 | 6/1985 | Raftis et al. | 138/109 |
| 4,619,470 | 10/1986 | Overath et al. | 285/423 |

FOREIGN PATENT DOCUMENTS

| | | | |
|---|---|---|---|
| 2342162 | 2/1974 | Fed. Rep. of Germany | 138/109 |
| 1134834 | 1/1985 | U.S.S.R. | 285/423 |

*Primary Examiner*—Randolph A. Reese
*Assistant Examiner*—Anthony Knight
*Attorney, Agent, or Firm*—A. Robert Theibault

[57] ABSTRACT

A flange made of fiber-reinforced thermosetting synthetic resin comprises at least one flange section extending in an axial direction, which is fitted, or can be fitted, on a tubular part to be provided with a flange. The flange section joins the inside face of the flange which, together with an outside face of the flange, defines the flange. The flange has several fibre-reinforcement layers laid around each other and extending in an axial direction, and which are spirally wound up. The flange section extending in the axial direction also consists of fibre-reinforcement layers and thermosetting synthetic resin. In the region of the angular intersection between the inside face of the flange and the flange section extending in the axial direction, there is situated a reinforcement layer which prevents crack formation and which extends from the inside face of the flange to the flange section extending in the axial direction. The reinforcement layer may be formed by a disc-shaped fibre-reinforcement layer having a central opening or may consists of a layer of spun roving.

11 Claims, 4 Drawing Sheets

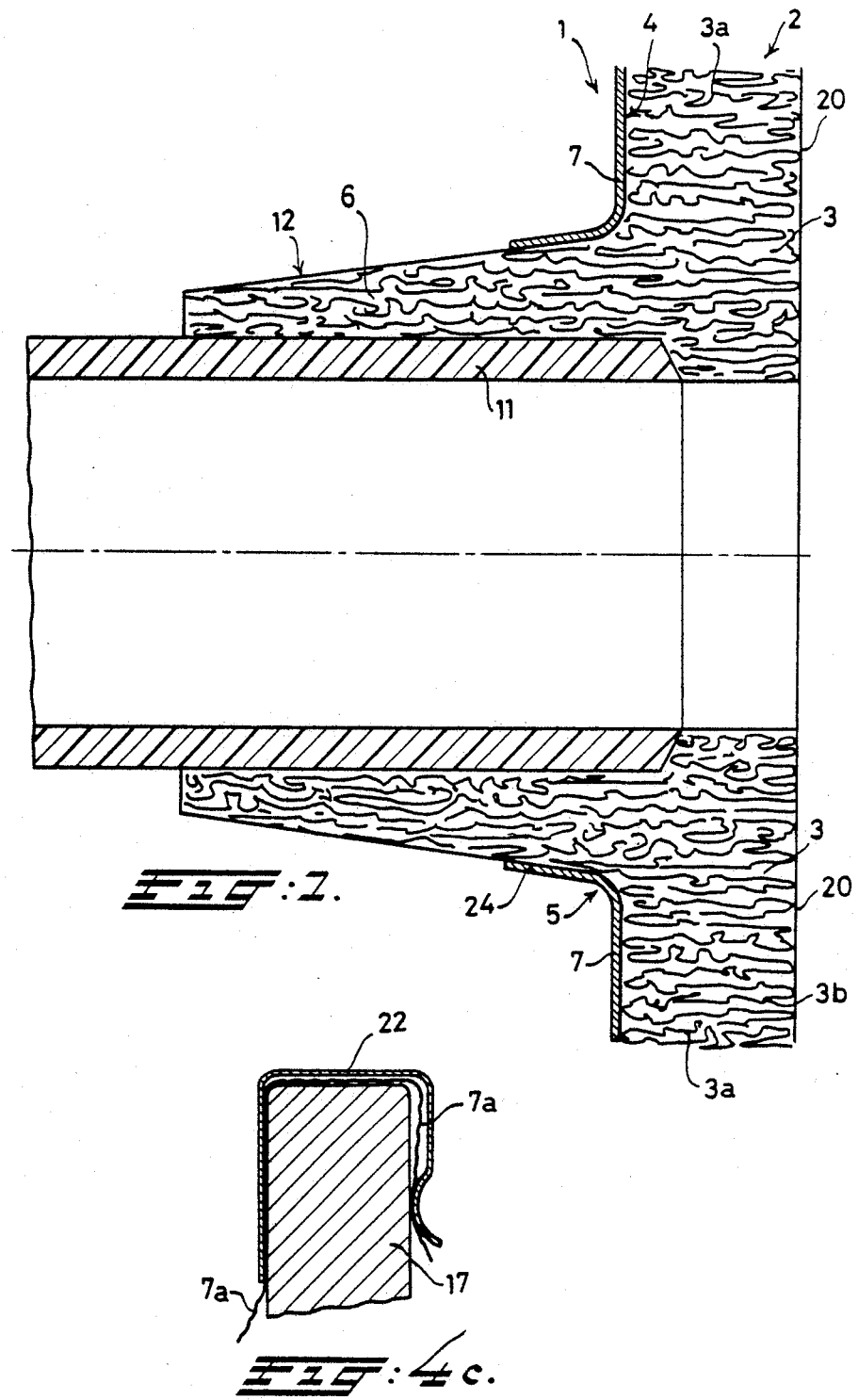

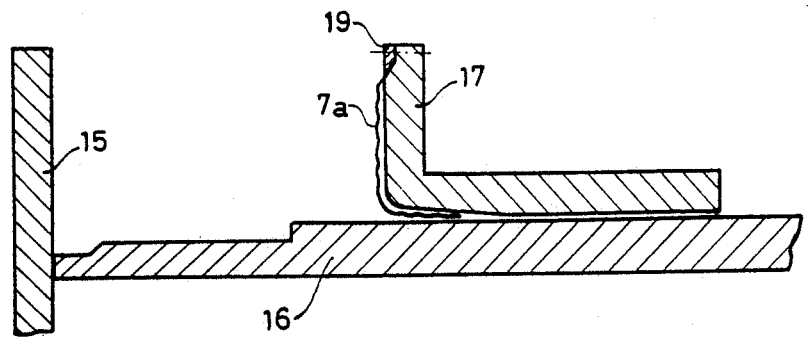
FIG: 2.
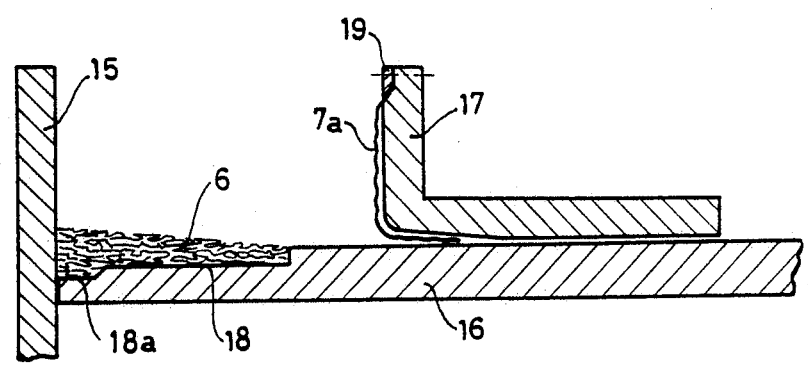
FIG: 3.
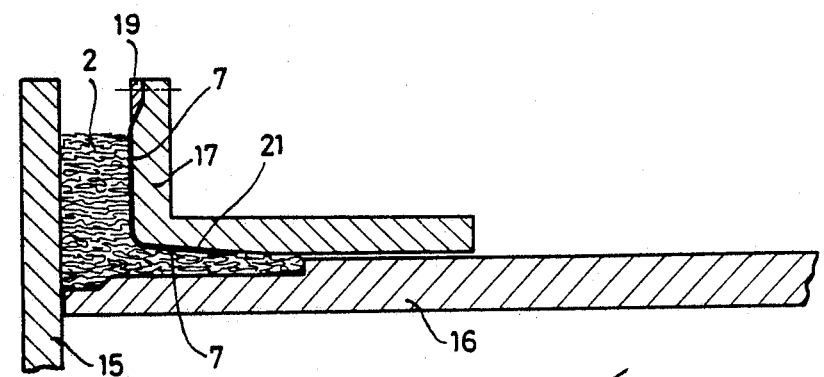
FIG: 4.

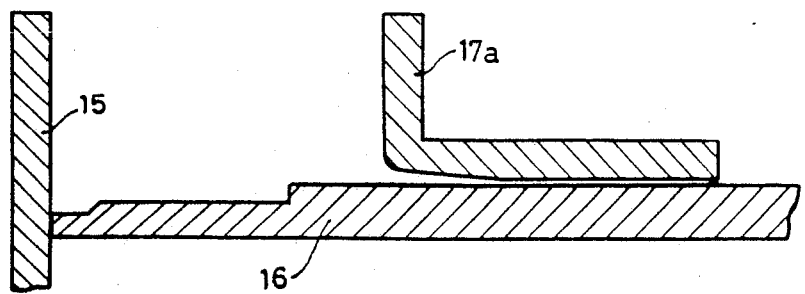
FIG: 6.
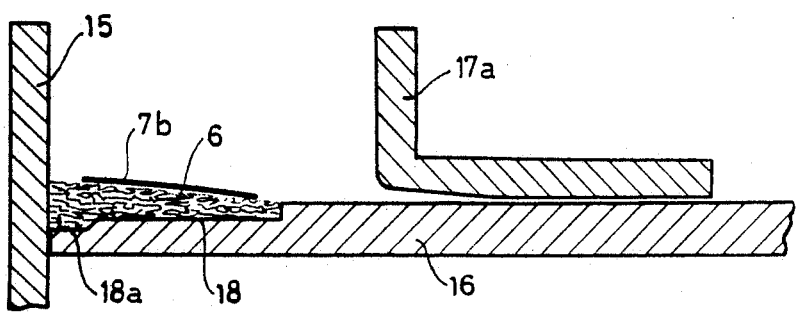
FIG: 7.
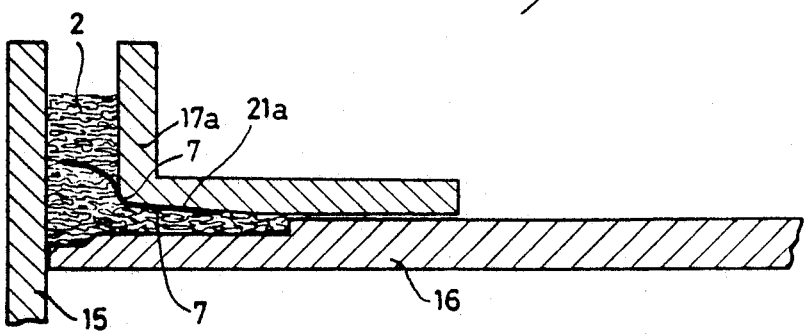
FIG: 8.
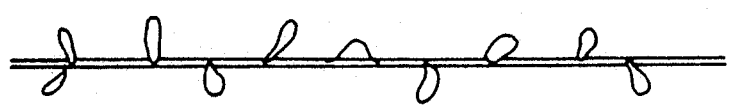
FIG: 9.

FLANGED PIPE PART MADE OF FIBER-REINFORCED THERMOSETTING SYNTHETIC RESIN WITH PROTECTIVE LAYER PREVENTING CRACK FORMATION IN AN ANGULAR INTERSECTION

This application is a continuation, of application Ser. No. 932,094, filed Nov. 18, 1986 now abandoned.

BACKGROUND OF THE INVENTION

The invention relates to a flanged pipe part made of fibre-reinforced thermosetting synthetic resin comprising at least a tubular part, extending in an axial direction, which is fitted, or can be fitted, on a tubular body to be provided with a tubing body, which tubular part adjoins the inside face of the flange which, together with the outside face of the flange, defines the flange. The flanged pipe part has several fibre-reinforcement layers laid around each other and extends in an axial direction, which are spirally wound thereabout and the tubular part also consists of fibre-reinforced layers of thermosetting synthetic resin.

Such a flange pipe part comprises fibre-reinforcement layers extending exclusively in the axial direction, which layers are spirally wound, the distance from the axis of the flange of at least one layer from the axis of the flange varying in a plane extending axially through the axis of the flange over the width of the fibre-reinforcement layer, which variation is formed during the winding, and is known from the Dutch Patent Application No. 7,810,838. When such fibre-reinforcement layers are used in a flange pipe part, said reinforcement layers lie irregularly on top of each other, as a result of which the shearing forces in the axial direction which are necessary to cause the layers to slide off are much greater than should a smooth roving be used or if fibre-reinforcement layers were used which extended precisely concentrically.

An advantage of said flange is that it is quicker to manufacture than the previously known flange, is stronger in the axial direction and, in addition, can be manufactured in a more reproducible manner.

The known flange does, however, have the disadvantage that, in the angular intersection between the inside face of the flange and the flange section extending in the axial direction and adjacent thereto, microcracks readily occur which, of course, have a very disadvantageous effect on the strength of the flange. Although said microcracks cannot generally be perceived with the naked eye, they can readily be revealed by the action of a dye stuff.

SUMMARY OF THE INVENTION

It is the object of the invention therefore to provide a flanged pipe part of the type mentioned at the beginning which does not have the above disadvantages.

The object is achieved according to the invention in that, in the region of the angular intersection between the inside face of the flange and the flange section extending in the axial direction, there is situated a reinforcement layer which prevents crack formation and which extends from the inside face of the flange to the flange section extending in the axial direction.

By using such a reinforcement layer which prevents crack formation, the abovementioned disadvantages of the appearance of microcracks in the angular intersection are eliminated and a flange of optimum strength is obtained.

The reinforcement layer which prevents crack formation is expediently formed by a disc-shaped fibre-reinforcement layer having a central opening and fitted on the inside face of the flange, with a disc section situated next to the central opening which continues on the flange section extending in the axial direction so as to cover the angular intersection between the inside face of the flange and the adjacent tubular part. The disc-shaped fibre-reinforcement layer which continues on the flange section may be constructed as a preformed or stretchable sleeve before fitting.

In a particularly advantageous embodiment, during applying on the flange the disc-shaped fibre-reinforcement layer is provided with incisions next to the central opening, which incisions form flaps, separated from each other, in the outside section of the flange section extending in the axial direction, the incisions next to the flaps, seen from said flange section, terminating in front of the said angular intersection in order to provide optimum protection for said angular intersection.

Preferably, the disc-shaped fibre-reinforcement layer consists of a fabric comprising preferably warp and weft threads.

In another expedient embodiment of the flange according to the invention the reinforcement layer which prevents crack formation consists of a layer of spun roving which, while the flange is being formed, is applied at least in the region of the angular intersection between the inside face of the flange and adjacent flange section by winding.

The invention also relates to a method for manufacturing a flanged pipe part of fibre-reinforced thermosetting synthetic resin comprising at least one flanged section, extending in the axial direction, which is fitted or can be fitted, on a tubular body to be provided with a flange, which flange section adjoins the inside face of the flange which, together with an outside flange face defines the flange. By forming the flange in a flange winding mould by winding up a fibre-reinforced strip spirally in the flange winding mould and also forming the said tubular part which extends in the axial direction from fibre-reinforced layers and thermosetting synthetic resin, and by forming a reinforced layer which prevents crack formation in the region of the angular intersection between the inside face of the tubular part to be formed and the flange section to be formed extends in the axial direction and which reinforced layer extends from the inside face of the flange to the tubular part section extending in the axial direction.

The reinforcement layer which prevents crack formation can be formed by applying a disc-shaped fibre-reinforced layer on the inside face of the flange and allowing the disc section situated next to the central opening to continue on the flange section extending in the axial direction so as to cover the angular intersection between the inside face of the flange and adjacent flange section, or after winding the flange section extending in the axial direction, by winding, at least in the region of the angular intersection to be formed between inside face of the flange and adjacent flange section, a layer of spun roving on the wound flange section and upsetting said layer in the axial direction so that said layer will extend at least in the angular intersection between the inside face of the flange and the adjacent flange section of the flange to be formed.

The invention will now be explained on the basis of an exemplary embodiment by means of the drawings.

BRIEF DESCRIPTION OF THE DRAWING

FIG. 1 shows a cross-section of a flange according to the invention which is joined to a tubular part made of thermosetting synthetic resin;

FIG. 2 shows a flange winding mould before the start of winding to form the flange;

FIG. 3 shows a flange winding mould according to FIG. 2 after applying a part of the flange with the flange section extending in the axial direction;

FIG. 4 shows a flange winding mould according to FIG. 2 during the forming of the flange according to the invention;

FIG. 4a shows a section of the flange winding mould in which the element is shown which secures a disc-shaped fibre-reinforcement layer;

FIG. 4b is a variation of a device according to FIG. 4a;

FIG. 4c is yet another variation of a device according to FIG. 4a;

FIGS. 6, 7 and 8 show a flange winding mould for forming a flange according to the invention with a layer preventing crack formation which consists of spun roving during a number of consecutive phases of the forming process corresponding to FIGS. 2, 3 and 4;

FIG. 9 shows a part of a spun roving.

DESCRIPTION OF THE PREFERRED EMBODIMENTS

Figures 4A, 4B:
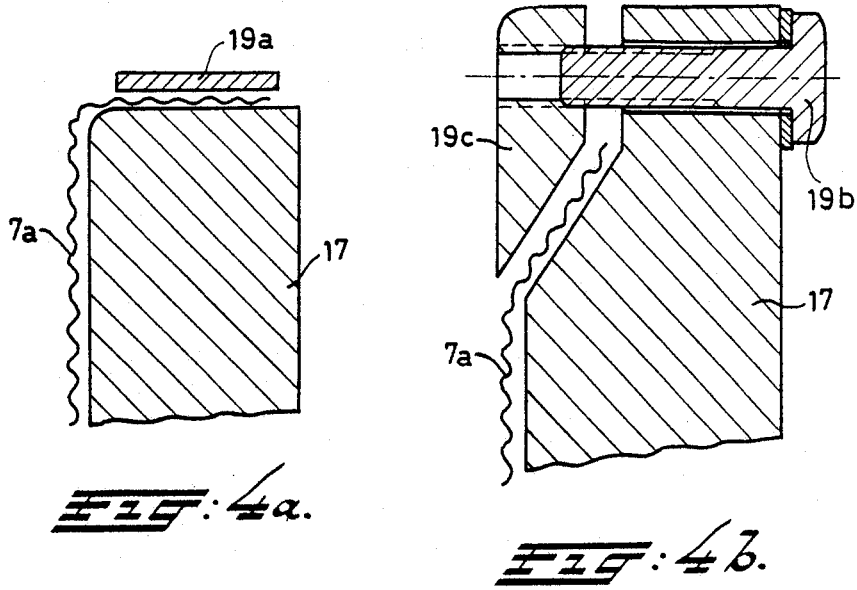

FIG. 1 shows a flange 1 of fibre-reinforced thermosetting synthetic resin, which flange is bounded by an inside face 4 of the flange and an outside face 20 of the flange. Adjacent to the inside face 4 of the flange is a flange section 6 also formed from fibre-reinforced thermosetting synthetic resin, which flange section extends in the axial direction and is joined on its inside to a tubular part 11 made of fibre-reinforced thermosetting resin.

It will, however, be clear that the flange 1 can also be marketed separately and a tube 11 can be provided with said flange 1 at the location where the flange joint is to be formed.

The flange section between the inside face 4 of the flange and the outside face 20 of the flange 1 is formed by spirally winding a glass fabric strip 3 soaked in thermosetting synthetic resin, which glass fabric strip 3 has a greater width than the width of the flange winding mould, as a result of which the strip 3 is either provided with corrugations 3a or is bent over at its ends which lie up against inside face 4 of the flange and outside face 5 of the flange.

As a result of the irregular placing of the reinforcement layers, the shearing forces needed in the axial direction to cause the layers formed by the strip 3 to slide relative to one another are much greater than if use is made of fibre-reinforcement layers, which extend precisely concentrically, these are obtained if the said strip 3 has the same width or a smaller width than the width of the flange winding mould.

It will therefore be clear that the central section 2 of the flange situated between inside face 4 of the flange and outside face 20 of the flange provides the flange with optimum strength.

This known flange has the disadvantage that microcracks occur at the angular intersection 5 where the inside face 4 of the flange merges into the flange section 6 extending in the axial direction.

In order to prevent the occurrence of said microcracks, the flange according to the invention is provided with a reinforcement layer 7 which extends in the region of the angular intersection 5, on the one hand, on the inside face 4 of the flange and, on the other hand, on the flange section 6 extending in the axial direction. Further an additional fiber-reinforcement layer having fibers arranged for reinforcement in the radial direction is provided.

In a particular embodiment of the flange according to the invention the reinforcement layer 7 which prevents crack formation shown in FIGS. 2 through 5 which is expediently obtained by applying a disc-shaped fibre-reinforcement layer 7a with a central opening 8. Obviously, the reinforced layer 7 may also consist of a preformed sleeve or stretchable sleeve of reinforced fabric.

In order to obtain a good fit of said disc-shaped fibre-reinforced layer on the inside face 4 of the flange and the flange section 6 extending in the axial direction, the outside diameter of the flange section 6 expediently decreases gradually from the inside face 4 of the flange to form a truncated conical outer surface 12 of said flange section 6.

In this way it is possible to ensure that the disc-shaped fibre-reinforcement layer 7a extends without folds in a funnel shape from the angular intersection 5 on the truncated conical outer surface 12 of said flange section 6.

Obviously, the angular intersection 5 between inside face 4 of the flange and the outside of the flange section 6 extending in the axial direction has a rounded shape.

Figure 5:
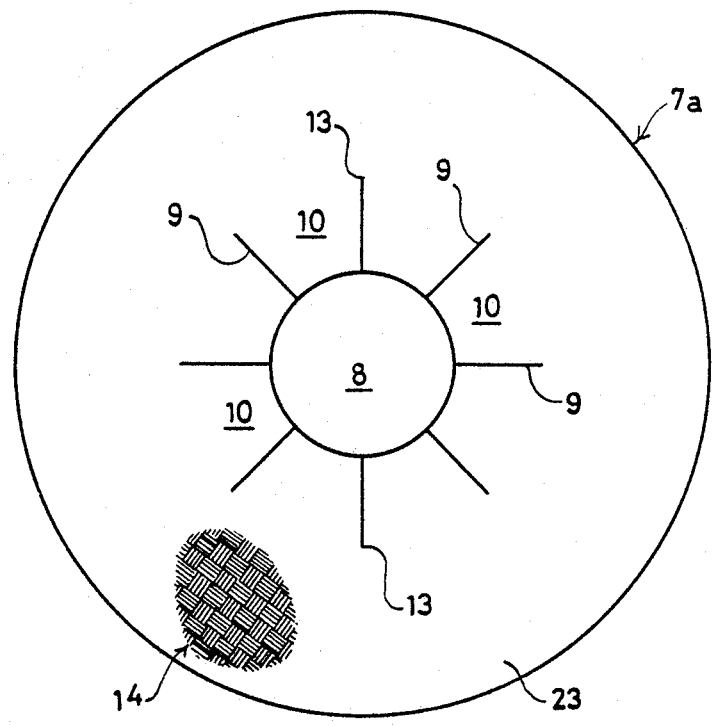
FIG. 5 shows a view of a disc-shaped fibre-reinforcement layer for forming a reinforcement layer which prevents crack formation.

To obtain a good fit as possible of the disc-shaped fibre-reinforcement layer 7a on the outside of the flange section 6 extending in the axial direction it is sometimes advisable to provide the disc-shaped fibre-reinforcement layer 7a before fitting with incisions 9 FIG. 5 which extend from the central opening 8. Obviously, care is then taken to ensure that the end points 13 of the incisions 9, seen from the flange section 6, terminate in front of the angular intersection with the finished flange.

The disc-shaped fibre-reinforcement layer 7 shown in FIG. 5 consists of a glass fabric reinforcement layer formed by means of warp and weft threads.

A detail of the fabric used for the disc-shaped fibre-reinforcement 7a is shown in FIG. 5 by reference numeral 14.

It will be clear that, as a result of the incisions 9, flaps 10 are formed which extend in the finished product on the outside of the flanged pipe part section 6 extending in the axial direction. To form the embodiment described above of a flange according to the invention, use is made of a flange winding mould, as shown in FIG. 2, comprising a front plate 15, a mould core 16, and a back plate 17.

The disc-shaped fibre-reinforcement layer 7a is fitted in the flange winding mould best seen in FIGS. 2 through 4 and its circumferential section 23 is secured by a securing element 19.

Said securing action can take place according to FIG. 4a by means of a clamping ring 19a or by means of a screw 19b as shown in FIG. 4b, which screw engages in plate 19c. FIG. 4c shows yet another embodiment in which the disc-shaped fibre-reinforcement layer 7a is secured by a number of clips 22 which are evenly distributed over the circumference of the back plate 17 of the mould.

As shown in FIG. 3, the flange winding mould core 16 is provided with a first recess 18 and a second recess 18a adjoining it which adjoins the front plate 15 of the flange winding mould.

In said recesses a section of the central part 2 of the flange and the flange section 6 adjoining the flange and extending in the axial direction is first formed by spirally winding a fabric soaked in thermosetting resin.

According to FIG. 4 the back plate 17 is then slid to the left to form the central flange section 2 between the front plate 15 and the back plate 17.

As is evident, the inside of the axial section 21 of the back plate 17 extends conically. As a result of this, the flange section 6 extending in the axial direction acquires an outside diameter which decreases gradually from the flange inside face 4 of the finished flange.

Simultaneously with the forming of the flange, the layer 7 which prevents crack formation is firmly joined to the inside face of the flange and the flange section 6 adjacent thereto, in particular at the position of the angular intersection 5 as shown in FIG. 1, by the liquid thermosetting resin which is on the glass fabric which is radially wound up to form the central section 2 of the flange.

The flange is then ready for use and it can be joined in the manner shown in FIG. 1 to a tube 11 made of thermosetting resin reinforced by a glass fabric or glass filaments.

In another embodiment of the flange according to the invention shown in FIGS. 7 and 8 the axial and radial reinforcement layer 7 which prevents crack information is obtained by applying a layer 7b of spun roving in the region of the angular intersection 5 between inside face of the flange and adjacent flange section 6 by winding.

This embodiment of the flange is primarily used in flanges having a relatively small diameter.

FIGS. 6, 7 and 8 show a number of consecutive phases of the forming process of such a flange.

The flange winding mould shown in FIG. 6 corresponds essentially with the winding mould shown in FIG. 2, with the difference that a disc-shaped reinforcement layer is not fitted on the back plate 17a.

The flange section 6 extending in the axial direction is formed, as is shown in FIG. 7, in the same manner as for the embodiment of the flange described earlier.

After forming the flange section 6, a layer 7b of spun roving as then wound on said flange section 6 at least in the region of the angular intersection 5 to be formed between inside face 4 of the flange and adjacent flange section 6 (FIG. 7).

The back plate 17a is then slid according to FIG. 7 to the left, the layer 7b being upset, after which the central flange section 2 is formed between the front plate 15 and the back plate 17a (FIG. 8). In the finished flange the layer 7b forms the reinforcing layer 7 which prevents crack formation and which extends at least in the angular intersection between inside face of the flange and adjacent flange section.

FIG. 9 shows a part of a spun roving.

As is evident, the inside of the axial section 21a of the back plate 17a extends conically. This is beneficial for upsetting the layer 7b. The flange section 6 extending in the axial direction thereby acquires a diameter which gradually decreases from the flange inside face 4 of the finished flange.

What is claimed is:

1. A flanged pipe part made of fiber-reinforced thermosetting synthetic material comprising an axially extending tubular part and a radially extending flange integral with said tubular part and bounded by a radially extending first end flange wall adjoining said tubular part and a radially extending second end flange comprising several fiber-reinforcement layers spirally wound around each other and extending in an axial direction, said tubular part comprising fiber-reinforcement layers also extending in an axial direction, said flanged pipe part further comprising and additional fiber-reinforcement layer positioned at least in the region of the angular intersection between said first wall of the flange and said tubular part and extending from the first wall of the flange to the outer surface of the tubular part, said additional fiber-reinforcement layer comprising fibers arranged such that a reinforcement in the radial direction is provided and crack formation is prevented in said region between said first wall flange and said tubular part.

2. A flanged pipe part according to claim 1, wherein the additional reinforcement layer is formed by a disc-shaped fibre-reinforcement layer having a central opening, said disc-shaped layer being applied to the first wall of the flange, with the disc section positioned next to the central opening continuing on the outer surface of the tubular part so as to cover the angular intersection between the first wall of the flange and the adjacent outer surface of said tubular part.

3. A flanged pipe part according to claim 2, wherein the disc-shaped fibre-reinforcement layer has been provided with incisions, next to the central opening, so as to form flaps, separated from each other, on the outer surface of the tubular part, the incisions, viewed from the tubular part, terminating in front of said angular intersection.

4. A flanged pipe part according to claim 2, wherein the disc-shaped fibre-reinforcement layer consists of a fabric having warp and weft threads.

5. A flanged pipe part according to claim 1, wherein the additional reinforcement layer consists of a layer of wound spun roving.

6. A flanged pipe part according to claim 1, wherein the first wall of the flange and the outer surface of the tubular part merge into each other via a rounded angle.

7. A flanged pipe part according to claim 1, wherein the tubular part is mounted on a fibre-reinforced tubular body of thermosetting synthetic material.

8. A method for manufacturing a flanged pipe part of fibre-reinforced thermosetting synthetic material comprising an axially extending tubular part and a radially extending flange integral with the tubular part and bounded by a radially extending first flange wall adjoining the tubular part and a radially extending second flange wall forming the end face of the flanged pipe part, which method comprises the steps of: forming the axially extending tubular part by winding a plurality of fibre-reinforcement layers coated with liquid thermosetting synthetic resin around a mandrel, forming the flange by spirally winding at least one continuous strip-shaped fibre-reinforcement layer coated with liquid thermosetting synthetic resin in a flange mould, and forming an additional radial reinforcement layer at least in the region of the angular intersection between the first wall of the flange and the tubular part said additional reinforcement layer extending from the first wall of the flange to the outer surface of the tubular part.

9. The method according to claim 8, wherein the additional reinforcement layer is formed by applying a disc-shaped fibre-reinforcement layer on the first wall of the flange and allowing the disc section situated next to the central opening to continue on the tubular part so as to cover the angular intersection between the first wall of the flange and adjacent outer surface of the tubular part.

10. The method according to claim 9, wherein the disc-shaped fibre-reinforcement layer is secured in the flange mould, at least during forming of the flange.

11. The method according to claim 8, wherein after winding the tubular part the additional reinforcement layer is formed by winding, at least in the region of the angular intersection to be formed between the first wall of the flange and adjacent tubular part, a layer of spun roving on the wound tubular part and by pushing said layer and the underlying layers of the tubular part in the axial direction therby forcing said layer of spun roving in radial direction such that said layer will extend at least in the angular intersection between said first wall of the flange to be formed and said adjacent tubular part.

* * * * *